United States Patent [19]

Brown et al.

[11] 4,135,607
[45] Jan. 23, 1979

[54] MAGNET SUPPORT FOR AN ELECTRIC BRAKE

[75] Inventors: Donald D. Brown, Thiensville; Terry L. Trindle, Port Washington, both of Wis.

[73] Assignee: Kelsey-Hayes Co., Romulus, Mich.

[21] Appl. No.: 827,886

[22] Filed: Aug. 26, 1977

[51] Int. Cl.² .................................... F16D 65/34
[52] U.S. Cl. .............................. 188/161; 188/138; 192/84 T
[58] Field of Search .............. 188/137, 138, 161, 163, 188/164; 192/84 T; 310/76, 77

[56] References Cited

U.S. PATENT DOCUMENTS

| | | | |
|---|---|---|---|
| 2,273,065 | 2/1942 | Penrose | 188/161 X |
| 3,049,192 | 8/1962 | Klavon, Jr. | 188/164 X |
| 3,244,259 | 4/1966 | Brede et al. | 188/138 |
| 3,757,264 | 9/1973 | Grove | 188/138 X |
| 4,014,412 | 3/1977 | Swanson et al. | 188/138 |

Primary Examiner—George E. A. Halvosa
Attorney, Agent, or Firm—Ralph J. Skinkiss; Ernest A. Beutler

[57] ABSTRACT

An electromagnetically actuated drum type brake embodying an improved support for the actuating magnet. The magnet is supported by a lever and when energized effects pivotal movement of the lever to actuate the brake. The support between the lever and magnet permits some floating movement of the magnet so as to accommodate for surface irregularities and relative movement between the magnet and the lever as is necessary to effect brake actuation. The support, however, restricts the degree of relative movement between the magnet and lever to acceptable values while transmitting the actuating force from the magnet to the lever. The support comprises an integral tab formed at the outer end of the lever which extends into an aperture in the magnet with sufficient clearance to permit limited movement in several directions. Rotary movement is, however, not restricted by this connection. The magnet housing also has an integral, outstanding tab that extends through an aperture in the lever to restrict the degree of pivotal movement and transmit the actuating force.

9 Claims, 3 Drawing Figures

MAGNET SUPPORT FOR AN ELECTRIC BRAKE

BACKGROUND OF THE INVENTION

This invention relates to an electrically actuated brake and more particularly to an improved support for the electromagnet of such a brake.

In one well known type of electrically actuated drum brake, the brake shoes are actuated by pivotal movement of a cammed lever that is supported on the backing plate. The lever carries an electromagnet which, when energized, engages the rotating drum and effects pivotal movement of the lever to actuate the brake shoes. It should be readily apparent that such an arrangement, of necessity, requires certain limited movement of the electromagnet relative to the supporting lever. That is, the electromagnet must move axially relative to the lever to engage the brake drum and must rotate slightly relative to the lever to accommodate the actuating pivotal movement of the lever. Although such relative movements must be afforded, it is also necessary to restrain the degree of movement of the electromagnet relative to the lever to minimize noise, wear and other similar difficulties as well as to transmit the actuating force from the magnet to the lever. A wide variety of constructions have been proposed for accommodating such relative movement while, at the same time, controlling the relative movement. Examples of arrangements which have been proposed for this purpose may be found in the following U.S. Pat. Nos. 3,244,259 issued Apr. 5, 1966 in the name of A. Brede III, et al., and entitled "Electric Brake Mechanism"; 3,476,223 issued Nov. 4, 1969 in the name of H. C. Hubbard, and entitled "Electromagnet"; 3,756,355 issued Sept. 4, 1973 in the name of Carl R. Kreider, and entitled "Electric Brake Construction"; 3,757,264 issued Sept. 4, 1973 in the name of Leroy K. Grove, and entitled "Electromagnet Operating Arm Retaining Means in a Vehicle Brake Structure"; 3,757,903 issued Sept. 11, 1973 in the name of Cletus McLane, and entitled "Electric Brake"; 3,760,909 issued Sept. 25, 1973 in the name of Leroy K. Grove, and entitled "Electromagnet for Brakes and Clutches"; 3,765,517 issued Oct. 16, 1973 in the name of Leroy King Grove, and entitled "Electric Brake Armature"; 4,014,412 issued Mar. 29, 1977 in the name of David L. Swanson, and entitled "Electrically Controlled Brake with Improved Anti-Rotation Bracket for Magnet".

The constructions illustrated in the aforenoted patents generally include an aperture in the electromagnet through which a projection of the lever extends. This construction affords some degree of limited movement. Rotary movement is controlled by having the aperture and projection configured to limit such movement or by including other ancillary structure such as stops for this control. Although the function to be served is relatively simple, the structures previously proposed for achieving the result are relatively complicated, expensive to manufacture and difficult to assemble and service.

It is, therefore, a principal object of the invention to provide an improved electrically actuated brake.

It is another object of the invention to provide an improved, simplified magnet support for such a brake.

It is a further object of the invention to provide an improved and simplified electric brake magnet support that controls the degree of relative movement between the magnet and the supporting lever without adding significantly to manufacturing or assembly costs.

SUMMARY OF THE INVENTION

A first feature of this invention is adapted to be embodied in an electrically actuated brake of the type having a pivotally supported lever adapted to operate the brake upon its pivotal movement and an electromagnet including a housing carried by the lever and operable when actuated to pivot the lever and operate the brake. The improvement comprises an opening formed in the electromagnet and a projection formed on the lever that extends through the magnet opening. The magnet opening and lever projection provide a clearance therebetween for permitting limited transverse and pivotal movement within predetermined limits without limiting the amount of rotation permitted by the electromagnet about the projection. The electromagnet housing has an integral projection that extends toward the lever and is adapted to cooperate with abutment means on the lever for limiting the amount of rotation of the electromagnet about the lever projection and for transmitting the actuating force from the electromagnet to the lever.

Another feature of the invention is adapted to be embodied in an electrically actuated brake of the type having a pivotally supported lever adapted to operate the brake upon its pivotal movement and an electromagnet carried by the lever and operable when actuated to pivot the lever. In connection with this feature, the improvement comprises a cylindrical opening formed in the electromagnet. The lever is formed from sheet metal and has an integral, rectangular tab that extends into the cylindrical magnet opening. There is sufficient clearance between the magnet opening and the lever tab to permit limited transverse and pivotal movement between the electromagnet and the lever without limiting the amount of rotation permitted by the electromagnet about the tab. The electromagnet and lever also have cooperating parts that limit the relative rotation of the magnet relative to the lever and thus assist in transmitting the actuating force.

DETAILED DESCRIPTION OF THE PREFERRED EMBODIMENT

Figure 1:
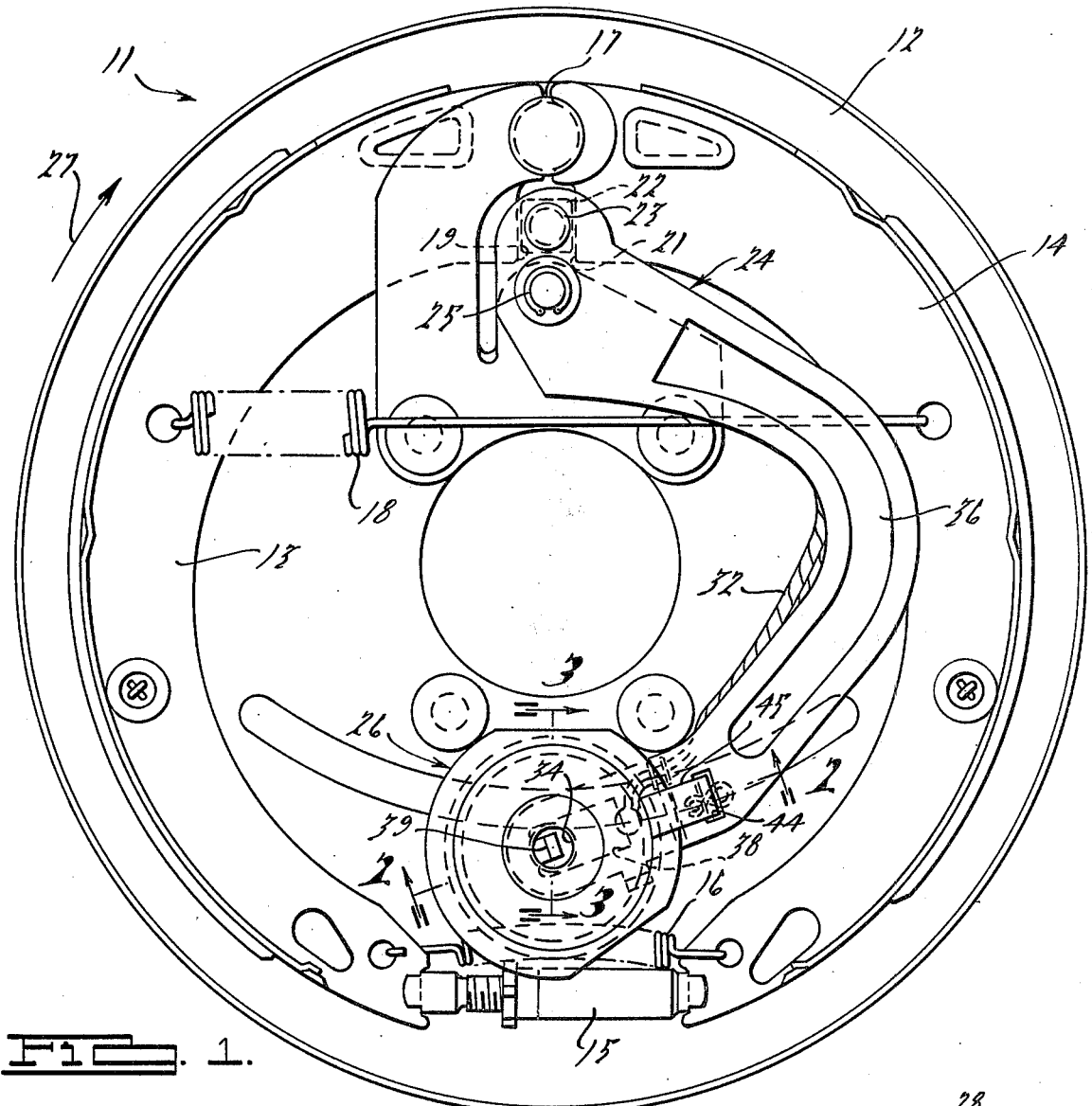
FIG. 1 is a side elevational view of an electrically actuated drum brake embodying this invention, with the drum removed to more clearly show the construction of the brake.

In the drawings the reference numeral 11 indicates generally an electrically operated drum type brake embodying this invention. In the drawings, the brake 11 has been depicted with the drum removed so as to show in more detail the salient features of the invention.

The brake 11 includes a backing plate 12 upon which a pair of brake shoes 13 and 14 are supported for relative movement in a known manner. An adjusting link 15 is interposed between the lower ends of the webs of the brake shoes 13 and 14 and these ends are held in engagement with the adjusting link 15 by means of a tension spring 16. The upper ends of the webs of the brake shoes 13 and 14 are held in engagement with a post 17, that is affixed in any known manner to the backing plate 12 by a retraction spring 18.

The webs of the brake shoes 13 and 14 have facing shoulders 19 and 21 between which a generally square slipper block 22 is positioned. The slipper block 22 is rotatably supported by means of a pin 23 on a sheet metal actuating lever 24. The actuating lever 24 is, in turn, pivotally supported upon the backing plate 12 by means of a pivot pin 25.

The actuating lever 24 carries an electromagnet assembly, indicated generally by the reference numeral 26, at its lower end, in a manner to be described in more detail. The electromagnet assembly 26 when energized will be brought into engagement with the associated brake drum (not shown), whose normal direction of rotation is indicated by the arrow 27. This engagement will cause the electromagnet assembly 26 to tend to rotate with the brake drum in the direction 27. This will effect pivotal movement of the actuating lever 24 in a clockwise direction about the pivot pin 25. Thus, the slipper block 22 will engage the shoulder of the brake shoe 14 and urge it outwardly into engagement with the associated brake drum. This engagement will tend to cause the brake shoe 14 to rotate also with the brake drum and thus exert an actuating force on the brake shoe 13 through the adjusting link 15. The aforedescribed construction is typical of the manner of actuation of such brakes and further description is believed to be unnecessary.

Figures 2, 3:
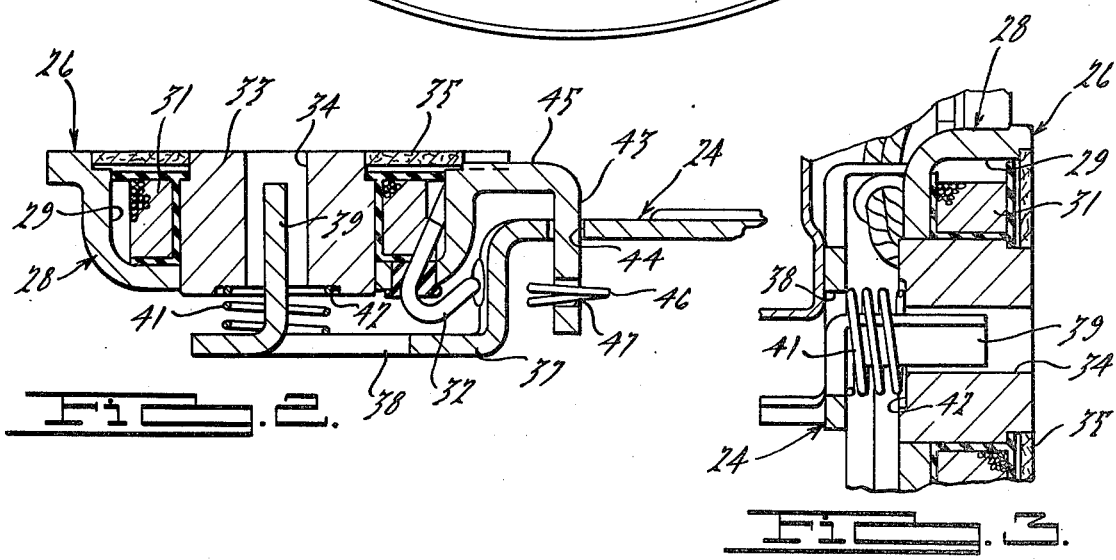
FIG. 2 is an enlarged cross-sectional view taken along the line 2—2 of FIG. 1 and shows certain details of the magnet support.
FIG. 3 is a cross-section, taken along the line 3—3 of FIG. 1, showing other details of the magnet support.

The invention herein disclosed relates primarily to the manner of support of the electromagnet 26 upon the lever 24, this construction being shown in more detail in FIGS. 2 and 3. Considering first the construction of the electromagnet 26, it comprises a metallic housing, indicated generally by the reference numeral 28, which may be formed as a stamping, casting or the like. The housing 28 has a generally cup shape and defines an internal cavity 29 in which a solenoid winding 31 is positioned. Suitable leads 32 extend from the winding 31 to afford connection to an appropriate brake actuator or controller. A magnet center pole 33 is positioned centrally of the winding 31 and has a cylindrical opening 34 extending therethrough. A suitable frictional material 35 encircles the center pole 33 and is adapted to frictionally engage the inner surface of the brake drum when the winding 31 is energized.

The actuating lever 24, as has been previously noted, is formed as a sheet metal stamping with a central reinforcing rib 36. Adjacent its outstanding end, the lever 24 is formed with an offset portion 37 to provide adequate clearance for the magnet assembly 26. The offset portion 37 is formed with an enlarged, generally rectangular opening 38. A generally rectangular tab 39, of smaller size than the opening 38, is bent at right angles to the lever offset portion 37 and extends into the center pole opening 34 of the electromagnet assembly 26. As may be readily seen in the Figures, the tab 39 is smaller in size than the opening 34 so as to permit limited pivotal and transverse movement of the electromagnet 26 relative to the lever 24. This limited relative movement permits the frictional lining 35 to engage the brake drum surface in full face to face contact without necessitating any axial movement of the end of the lever 24. It should further be noted that the construction of the opening 34 and tab 39 does not in any way restrict rotation of the electromagnet 26 relative to the lever 24.

A light compression spring 41 encircles the tab 39 and engages the lever offset portion 37 and a counter bore 42 formed in the magnet center pole 33. This light spring 41 maintains the frictional lining 35 in light rubbing contact with the brake drum surface.

In order to limit the rotation of the electromagnet assembly 26 relative to the lever 24 to prevent inadvertent disassembly during service periods when the brake drum is removed and to transmit actuating forces from the electromagnet assembly 26 to the lever 24, the magnet housing 28 is formed with an integrally inwardly extending tab 43. The tab 43 is aligned with the portion of the lever 24 which is not offset and extends through a generally rectangular opening 44 formed in the lever 24. There is sufficient clearance between the tab 43 and the opening 44 to permit limited movement, while controlling the maximum degree of rotation which the magnet 26 may experience relative to the lever 24 and transmitting the actuating forces. The tab 43 is connected to the remainder of the magnet housing 28 by means of an integral outwardly extending arm 45.

The electromagnet assembly 26 is retained relative to the lever 24 by means of a small spring clip 46 that extends through an opening 47 formed in the magnet housing tab 43 on the inner side of the lever 24. For replacement of the magnet assembly 26 the clip 46 need only be removed.

It should be readily apparent that the aforedescribed construction permits controlled and yet limited movement of the electromagnet 26 relative to the lever 24. This is achieved without the use of separate retaining clips or posts or the like which must be staked to the various components. Thus, an extremely low cost assembly is provided which also affords ease of manufacture and assembly.

It is to be understood that the foregoing description is that of a preferred embodiment of the invention. Various changes and modifications may be made without departing from the spirit and scope of the invention as defined by the appended claims.

We claim:

1. In an electrically actuated brake of the type having a pivotally supported lever adapted to operate the brake upon pivotal movement and an electromagnet including a housing carried by said lever and operable when actuated to pivot said lever, the improvement comprising an opening formed in said electromagnet, a projection formed on said lever extending through said magnet opening, said magnet opening and said lever projection providing a clearance therebetween for permitting limited transverse and pivotal movement therebetween without limiting the amount of rotation permitted by said electromagnet about said projection, said electromagnet housing having an integral projection extending toward said lever and adapted to cooperate with abutment means on said lever for allowing a limited relative rotation of said electromagnet about said lever projection and for transmitting actuating forces from said electromagnet to said lever.

2. An electrically actuated brake as set forth in claim 1 wherein the lever is formed as a sheet metal piece and said lever projection comprises a tab folded out of the plane of said lever.

3. An electrically actuated brake as set forth in claim 2 further including biasing spring means interposed between the lever and the electromagnet and encircling the lever projection for urging said electromagnet toward an associated brake component.

4. An electrically actuated brake as set forth in claim 2 wherein the electromagnet opening comprises a cylindrical passage extending through the center pole of said electromagnet.

5. An electrically actuated brake as set forth in claim 4 wherein the abutment means on the lever comprises an opening through which the electromagnet housing integral projection extends.

6. An electrically actuated brake as set forth in claim 5 wherein the tab on the lever extends from an enlarged opening formed in the lever.

7. In an electrically actuated brake of the type having a pivotally supported lever adapted to operate the brake upon its pivotal movement and electromagnet carried by said lever and operable when actuated to pivot said lever, the improvement comprising a cylindrical opening formed in the pole piece of said electromagnet, said lever comprising a sheet metal piece having a folded tab extending into said cylindrical opening, said opening and said lever tab providing a clearance therebetween for permitting limited transverse and pivotal movement therebetween without limiting the amount of rotation permitted by said electromagnet about said tab, and cooperating abutment means on said electromagnet and said lever for allowing a limited degree of rotation of said electromagnet relative to said lever and for transmitting actuating forces from said electromagnet to said lever.

8. An electrically actuated brake as set forth in claim 7 wherein the lever tab is folded out of an enlarged opening formed in the plane of said lever.

9. An electrically actuated brake as set forth in claim 8 wherein the electromagnet further includes a generally cup shaped housing, a winding received in an opening of said housing and encircling the center pole, a frictional material surrounding said pole and adapted to engage an associated brake component when said electromagnet is energized, said housing having an outstanding arm formed integrally therewith, the abutment means comprising a generally rectangular opening formed in said lever and a tab extending integrally from said arm through said opening.

* * * * *